(12) United States Patent
Jones et al.

(10) Patent No.: US 10,385,514 B1
(45) Date of Patent: Aug. 20, 2019

(54) IDENTIFICATION DOCUMENT WITH DYNAMIC WINDOW

(71) Applicant: MorphoTrust USA, LLC, Billerica, MA (US)

(72) Inventors: Robert Jones, Andover, MA (US); Daoshen Bi, Boxborough, MA (US); Dennis Mailloux, Westminster, MA (US); Arthur Patrick McDeed, III, Merrimack, NH (US)

(73) Assignee: Idemia Identity & Security USA LLC, Billerica, MA (US)

( * ) Notice: Subject to any disclaimer, the term of this patent is extended or adjusted under 35 U.S.C. 154(b) by 0 days.

(21) Appl. No.: 14/984,651

(22) Filed: Dec. 30, 2015

Related U.S. Application Data

(60) Provisional application No. 62/098,904, filed on Dec. 31, 2014, provisional application No. 62/098,276, filed on Dec. 30, 2014, provisional application No. 62/098,236, filed on Dec. 30, 2014.

(51) Int. Cl.
  *D21H 21/48*  (2006.01)
  *B42D 25/45*  (2014.01)
  *B42D 25/23*  (2014.01)
  *B42D 25/309* (2014.01)

(52) U.S. Cl.
  CPC ............ *D21H 21/48* (2013.01); *B42D 25/23* (2014.10); *B42D 25/309* (2014.10); *B42D 25/45* (2014.10)

(58) Field of Classification Search
  CPC ...... D21H 21/48; B42D 25/23; B42D 25/309; B42D 25/45
  USPC .......... 283/72, 74, 75, 94, 98, 109, 114, 901
  See application file for complete search history.

(56) References Cited

U.S. PATENT DOCUMENTS

| | | | |
|---|---|---|---|
| 2006/0151989 A1* | 7/2006 | Muke | B41M 1/24 283/67 |
| 2010/0001508 A1* | 1/2010 | Tompkin | D21H 21/44 283/85 |
| 2010/0045024 A1* | 2/2010 | Attner | B32B 29/06 283/72 |
| 2011/0057040 A1 | 3/2011 | Jones et al. | |

* cited by examiner

*Primary Examiner* — Justin V Lewis
(74) *Attorney, Agent, or Firm* — Fish & Richardson P.C.

(57) ABSTRACT

An identification document including a multilayer laminate having a core layer defining an opening therethrough, and a dynamic window in the opening. The dynamic window includes an optically variable coating on at least a front or a back of the dynamic window. The optically variable coating appears transparent when viewed from the front of the identification document in light transmitted through the dynamic window from the back of the identification document toward the front of the identification document, and appears nontransparent when viewed from the front of the identification document in light reflected from the front of the identification document. Fabricating an identification document with a dynamic window includes forming an opening in a core layer, positioning a dynamic window in the opening, and plate laminating the core layer and the dynamic window between at least one outer layer on each side of the core layer.

26 Claims, 4 Drawing Sheets

IDENTIFICATION DOCUMENT WITH DYNAMIC WINDOW

CROSS REFERENCE TO RELATED APPLICATIONS

This application claims priority to U.S. Patent Application Ser. No. 62/098,276 entitled "IDENTIFICATION DOCUMENT WITH WINDOW" and filed on Dec. 30, 2014; U.S. Patent Application Ser. No. 62/098,236 entitled "IDENTIFICATION DOCUMENT WITH MULTIVIEW IMAGE" and filed on Dec. 30, 2014; and U.S. Patent Application Ser. No. 62/098,904 entitled "IDENTIFICATION DOCUMENT WITH EMBEDDED 3D INFORMATION" and filed on Dec. 31, 2014, all of which are herein incorporated by reference in their entirety.

TECHNICAL FIELD

This disclosure generally relates to a laminated identification ("ID") document including a dynamic window.

BACKGROUND

Identification ("ID") documents play a critical role in today's society. One example of an ID document is an ID card. ID documents are used on a daily basis to prove identity, to verify age, to access a secure area, to evidence driving privileges, to cash a check, and so on. Airplane passengers are required to show an ID document during check in, security screening, and prior to boarding their flight. In addition, because we live in an ever-evolving cashless society, ID documents are used to make payments, access an automated teller machine (ATM), debit an account, make a payment, and the like.

Many ID documents include a core layer which can be pre-printed, such as a light-colored, opaque material. The core is laminated with a transparent material to form a so-called "card blank." Information, such as variable personal information (e.g., photographic information), is printed on the card blank. The information may include an indicium or indicia, such as the invariable information common to a large number of ID documents (e.g., for example the name and logo of the organization issuing the documents). To protect the information that is printed, an additional layer of transparent overlaminate is typically coupled to the card blank and printed information.

Many ID documents are made via roll laminating processes. Roll laminating processes introduce stresses by stretching and laminating in a non-uniform manner, resulting in steady state processes that produce thermal stresses that change over time. These ID documents typically require adhesives, the presence of which may promote tampering that can result in separation of these ID documents into layers.

SUMMARY

In a first general aspect, an identification document includes a multilayer laminate having a core layer defining an opening therethrough, and a dynamic window in the opening. The dynamic window includes an optically variable coating on at least a front or a back of the dynamic window. The front of the dynamic window is between a front of the identification document and the back of the dynamic window, and the back of the dynamic window is between a back of the identification document and the front of the dynamic window. The optically variable coating appears to be transparent when viewed from the front of the identification document in light transmitted through the dynamic window from the back of the identification document toward the front of the identification document, and appears to be nontransparent when viewed from the front of the identification document in light reflected from the front of the identification document.

In a second general aspect, fabricating an identification document includes forming an opening in a core layer, positioning a dynamic window in the opening, and plate laminating the core layer and the dynamic window between at least one outer layer on each side of the core layer. The dynamic window includes an optically variable coating on at least a front or a back of the dynamic window. The front of the dynamic window is between a front of the identification document and the back of the dynamic window, and the back of the dynamic window is between a back of the identification document and the front of the dynamic window. The optically variable coating appears to be transparent when viewed from a front of the identification document in light transmitted through the dynamic window from a back of the identification document toward the front of the identification document, and appears to be nontransparent when viewed from the front of the identification document in light reflected from the front of the identification document.

Implementations of the first or second general aspect may include one or more of the following features.

The dynamic window typically includes a clear plastic layer, and the optically variable coating is on a front of the clear plastic layer, a back of the clear plastic layer, or both, with the front of the clear plastic layer corresponding to the front of the dynamic window, and the back of the clear plastic layer corresponding to the back of the dynamic window. The optically variable coating may include an inorganic pigment dispersed in a binder, with the inorganic pigment including particles aligned in the binder to yield a mirror effect in reflected light. The optical intensity of the dynamic window changes according to the angle at which it is viewed in reflected light. For example, a maximum optical intensity of the dynamic window in reflected light is achieved near the angle at which the incident light is totally reflected from the optically variable coating, and the dynamic window appears to be opaque when the incident light is totally reflected from the optically variable coating.

In some cases, the identification document includes an image on a layer of the multilayer laminate between a front of the identification document and the front of the dynamic window or between a back of the identification document and the back of the dynamic window, with the image superimposed on the dynamic window. The image may be a color image. When the optically variable coating is on a back of the dynamic window and the image is on a layer of the multilayer laminate between the front of the identification document and the front of the dynamic window, the image is visible from the front of the identification document in light reflected from the front of the identification document and is visible from the front of the identification document in light transmitted from the back of the identification document through the dynamic window. When the optically variable coating is on a back of the dynamic window and the image is on a layer of the multilayer laminate between the front of the identification document and the front of the dynamic window, the image is invisible from the back of the identification document in light reflected from the back of the identification document and is visible from the back of the identification document in light transmitted from the front of the identification document through the dynamic window.

In certain cases, the dynamic window is laser engraved such that the laser engraving is visible when the identification document is viewed from the front with light transmitted from the back of the identification document to the front of the identification document through the dynamic window, and is not visible when the identification document is viewed from the front of the identification document in reflected light.

The identification document typically includes a tie layer laminated to each side of the core layer. A laser engraved image (e.g., a hologram or a KINEGRAM) may be formed in at least one of the tie layers. The laser engraved image may be formed such that the optically variable coating on the dynamic window is not altered (e.g., is not ablated or removed) by the engraving process. A structural layer is typically laminated to the outer side of each tie layer, and a receiver layer is typically adjacent the outer side of each structural layer. The multilayer laminate may be devoid of an adhesive composition. That is, the laminating process may occur in the absence of an adhesive composition.

In some cases, identical images are printed on each receiver layer and on the front or back of the dynamic window or superimposed over the front or back of the dynamic window, wherein the identical images are superimposed such that the identical images appear to be a single image or three separate images based on the angle at which the dynamic window is viewed from the front of the identification document in light transmitted through the dynamic window from a back of the identification document toward the front of the identification document.

In certain cases, the optically variable coating is a first optically variable coating on the front of the dynamic window, and the identification document includes a second optically variable coating on the back of the dynamic window. The first optically variable coating may be the same as or different from the second optically variable coating. The optically variable coating may completely cover the front of the dynamic window, the back of the dynamic window, or both. The optically variable coating may cover selected portions of the front of the dynamic window, the back of the dynamic window, or both.

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

Figure 1:
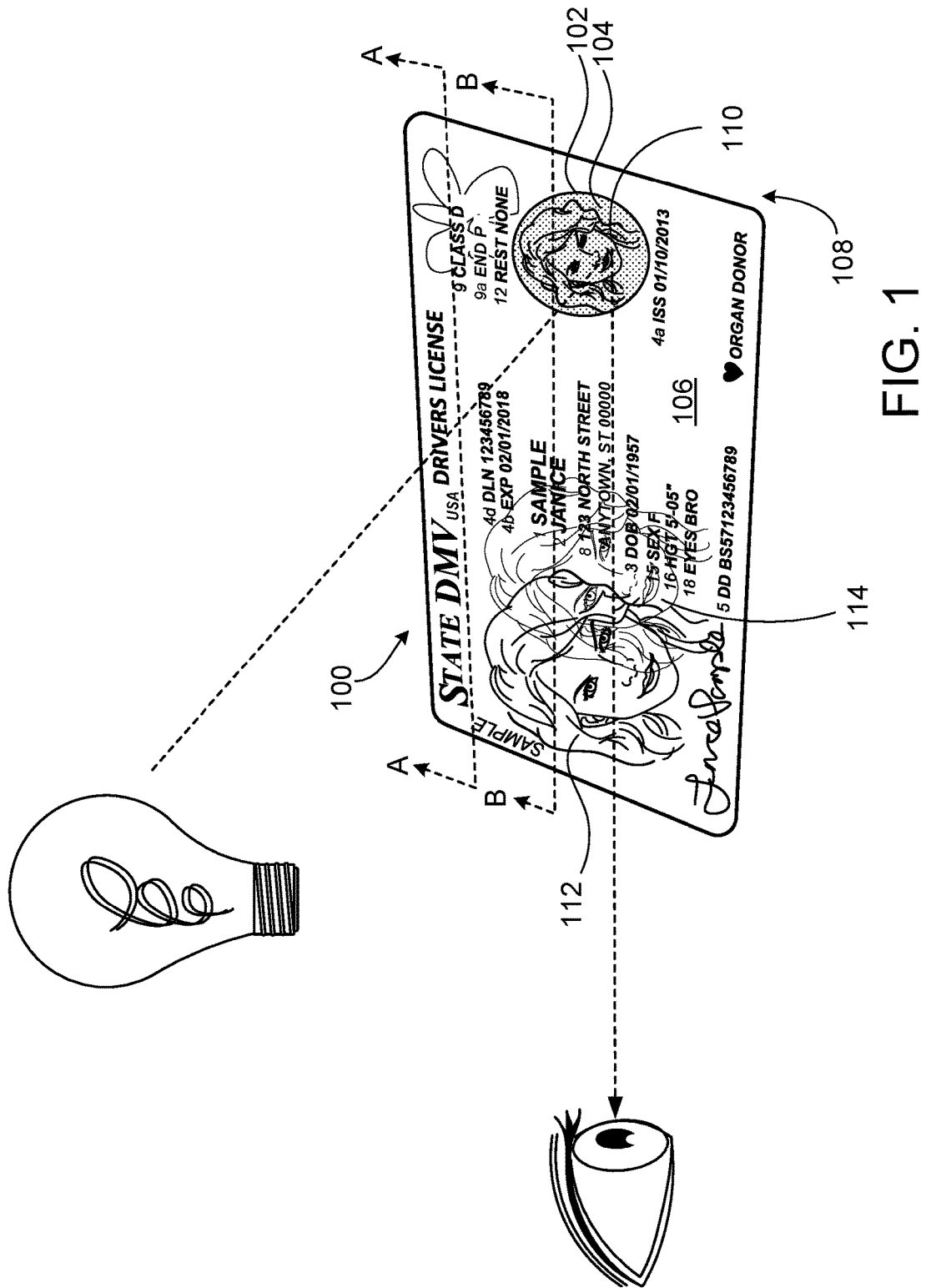
FIG. 1 depicts an ID document with a dynamic window viewed from the front of the ID document in reflected light having a first angle of reflection with respect to the front of the ID document.

Identification (ID) documents described herein are made via a platen lamination process. The platen lamination process yields flat cards with little or no thermal stress. Surface interactions due to electric charge and surface non-evenness are also reduced or eliminated, thereby improving card transportation in the printer. The platen lamination process also allows for surface debossing in the final construct. This lamination process reduces materials costs by eliminating the use of adhesives. A dynamic window may be formed in any location on the ID document. As used herein, "dynamic window" generally refers to an insert in an ID document that appears to be transparent when viewed from a first side (e.g., a front) of the identification document in light transmitted through the dynamic window from a second side (e.g., a back) of the identification document toward the first side (e.g., the front) of the identification document, and appears to be nontransparent when viewed from a first side (e.g., a front) of the identification document in light reflected from the dynamic window from the first side (e.g., the front) of the identification document. The dynamic window has optically variable properties (e.g., an appearance that changes upon viewing under radiation with light of various wavelengths, upon viewing in reflected or transmitted light, upon viewing at a particular angle of incident light, or the like. A wide variety of materials with a range of optical properties may be used in the dynamic window.

ID documents described herein are suitable for Dye Diffusion Thermal Transfer (D2T2) personalization, laser (e.g., YAG and $CO_2$) personalization, or both. These ID documents may be "over-the-counter" documents or "central issue" documents, and may be personalized in either process. The ID documents may have transparency enhancement properties. U.S. 2011/0057040, entitled "OPTICALLY VARIABLE PERSONALIZED INDICIA FOR IDENTIFICATION DOCUMENTS" is incorporated by reference herein with respect to various features and fabrication processes related to ID documents.

As used herein, "ID document" is broadly defined and intended to include all types of ID documents, including, documents, magnetic disks, credit cards, bank cards, phone cards, stored value cards, prepaid cards, smart cards (e.g., cards that include one more semiconductor chips, such as memory devices, microprocessors, and microcontrollers), contact cards, contactless cards, proximity cards (e.g., radio frequency (RFID) cards), passports, driver licenses, network access cards, employee badges, debit cards, security cards, visas, immigration documentation, national ID cards, citizenship cards, social security cards, security badges, certificates, identification cards or documents, voter registration and/or identification cards, police ID cards, border crossing cards, security clearance badges and cards, legal instruments, gun permits, badges, gift certificates or cards, membership cards or badges, and tags. Also, the terms "document," "card," "badge" and "documentation" are used interchangeably throughout this disclosure. In addition, ID document can include any item of value (e.g., currency, bank notes, and checks) where authenticity of the item is important, where counterfeiting or fraud is an issue, or both.

ID documents such as driver licenses can contain information such as a photographic image, a bar code (which may contain information specific to the person whose image appears in the photographic image, and/or information that is the same from ID document to ID document), variable personal information, such as an address, signature, and/or birthdate, biometric information associated with the person whose image appears in the photographic image (e.g., a fingerprint), a magnetic stripe (which, for example, can be on the a side of the ID document that is opposite the side with the photographic image), and various security features, such as a security pattern (for example, a printed pattern comprising a tightly printed pattern of finely divided printed and unprinted areas in close proximity to each other, such as a fine-line printed security pattern as is used in the printing of banknote paper, stock certificates, and the like).

In the production of images useful in the field of identification documentation, it may be desirable to embody into a document (such as an ID card, driver license, passport or the like) data or indicia representative of the document issuer (e.g., an official seal, or the name or mark of a company or educational institution) and data or indicia representative of the document bearer (e.g., a photographic likeness, name or address). Typically, a pattern, logo or other distinctive marking representative of the document issuer will serve as a means of verifying the authenticity, genuineness or valid issuance of the document. A photographic likeness or other data or indicia personal to the bearer will validate the right of access to certain facilities or the prior authorization to engage in commercial transactions and activities.

As used herein, "identification" at least refers to the use of an ID document to provide identification and/or authentication of a user and/or the ID document itself. For example, in a conventional driver license, one or more portrait images on the card are intended to show a likeness of the authorized holder of the card. For purposes of identification, at least one portrait on the card (regardless of whether or not the portrait is visible to a human eye without appropriate stimulation) preferably shows an "identification quality" likeness of the holder such that someone viewing the card can determine with reasonable confidence whether the holder of the card actually is the person whose image is on the card. "Identification quality" images, in at least one instance, include covert images that, when viewed using the proper facilitator (e.g., an appropriate light source for covert images, an appropriate temperature source for thermochromic images, etc.), provide a discernable image that is usable for identification or authentication purposes.

There are a number of reasons why an image or information on an ID document might not qualify as an "identification quality" image. Images that are not "identification quality" may be too faint, blurry, coarse, small, etc. to be able to be discernable enough to serve an identification purpose. An image that might not be sufficient as an "identification quality" image, at least in some environments, could, for example, be an image that consists of a mere silhouette of a person, or an outline that does not reveal what might be considered essential identification essential (e.g., hair color or eye color) of an individual.

Certain images may be considered to be "identification quality" if the images are machine readable or recognizable, even if such images do not appear to be "identification quality" to a human eye, whether or not the human eye is assisted by a particular piece of equipment, such as a special light source. For example, in at least one embodiment, an image or data on an ID document can be considered to be "identification quality" if it has embedded in it machine-readable information (such as digital watermarks or steganographic information) that also facilitate identification and/or authentication.

Further, in at least some embodiments, "identification" and "authentication" are intended to include (in addition to the conventional meanings of these words), functions such as recognition, information, decoration, and any other purpose for which an indicia can be placed upon an article in the article's raw, partially prepared, or final state. Also, in addition to ID documents, techniques described herein can be employed with product tags, product packaging, business cards, bags, charts, maps, labels, and the like, particularly those items including marking of a laminate or over-laminate structure. "ID document" thus is broadly defined herein to include these tags, labels, packaging, cards, etc.

"Personalization," "personalized data," and "variable" data are used interchangeably herein, and refer at least to data, characters, symbols, codes, graphics, images, and other information or marking, whether human readable or machine readable, that is (or can be) "personal to" or "specific to" a specific cardholder or group of cardholders. Personalized data can include data that is unique to a specific cardholder (such as biometric information, image information, serial numbers, Social Security Numbers, privileges a cardholder may have, etc.), but is not limited to unique data. Personalized data can include some data, such as birthdate, height, weight, eye color, address, etc., that are personal to a specific cardholder but not necessarily unique to that cardholder (for example, other cardholders might share the same personal data, such as birthdate). In at least some embodiments, personal/variable data can include some fixed data, as well.

For example, in at least some embodiments, personalized data refers to any data that is not pre-printed onto an ID document in advance, so such personalized data can include both data that is cardholder-specific and data that is common to many cardholders. Variable data can, for example, be printed on an information-bearing layer of the ID card using thermal printing ribbons and thermal printheads. Personalized and/or fixed data is also intended to refer to information that is (or can be) cross-linked to other information on the ID document or to the ID document's issuer. For example, personalized data may include a lot number, inventory control number, manufacturing production number, serial number, digital signature, etc. Such personalized or fixed data can, for example, indicate the lot or batch of material that was used to make the ID document, what operator and/or manufacturing station made the ID document and when, etc.

The terms "indicium" and "indicia" as used herein cover not only markings suitable for human reading, but also markings intended for machine reading, and include (but are not limited to) characters, symbols, codes, graphics, images, etc. Especially when intended for machine reading, such an indicium need not be visible to the human eye, but may be in the form of a marking visible only under infra-red, ultra-violet or other non-visible radiation. Thus, in at least some embodiments, an indicium formed on any layer in an ID document may be partially or wholly in the form of a marking visible only under non-visible radiation. Markings including, for example, a visible "dummy" image superposed over a non-visible "real" image intended to be machine read may also be used.

"Laminate" and "overlaminate" include (but are not limited to) film and sheet products. Laminates usable with at least some embodiments include those which contain substantially transparent polymers or which have substantially transparent polymers as a part of their structure. Examples of suitable laminates include at least polyester, polycarbonate, polystyrene, cellulose ester, polyolefin, polysulfone, or polyamide. Laminates can be made using either an amorphous or biaxially oriented polymer as well. The laminate can comprise a plurality of separate laminate layers, for example a boundary layer, a film layer, or both.

The degree of transparency of the laminate can, for example, be dictated by the information contained within the ID document, the particular colors and/or security features used, etc. The thickness of the laminate layers is not critical, although in some embodiments it may be preferred that the thickness of a laminate layer be about 1-20 mil (about 25-500 µm). Types and structures of the laminates described herein are provided only by way of example, those skilled in the art will appreciate that many different types of laminates are suitable.

For example, in ID documents, a laminate can provide a protective covering for the printed substrates and provides a level of protection against unauthorized tampering (e.g., a laminate would have to be removed to alter the printed information and then subsequently replaced after the alteration). The material(s) from which a laminate is made may be transparent, but need not be. Laminates can include synthetic resin-impregnated or coated base materials composed of successive layers of material, bonded together via heat, pressure, or both. As described herein, laminates may be fused polycarbonate structures formed in the absence of adhesives. Laminates also include security laminates, such as a transparent laminate material with proprietary security technology features and processes, which protects documents of value from counterfeiting, data alteration, photo substitution, duplication (including color photocopying), and simulation by use of materials and technologies that are commonly available. Laminates also can include thermosetting materials, such as epoxies.

For purposes of illustration, examples illustrate various aspects using images that are representative of a bearer of an ID document (e.g., a photographic likeness). However, virtually any indicium can be usable as an "image," which is used herein to include virtually any type of indicium.

Different image processing techniques may be used to preprocess an original image that is to be printed as a covert and/or optically variable image (using, for example, covert and/or optically variable media) depending on whether the tonality of image reproduction (e.g., printing process) is bitonal (e.g., two tones such as black and white or a first color and second color) or monochromatic (e.g., shaded image, grayscale, etc.). Other optional factors to consider include the viewing methods used with the image, such as reflectance, transmissive characteristics (e.g., UV glowing) and tactility. As used herein, "optically variable device" (OVD) generally refers to an image (e.g., an iridescent image) that exhibits various optical effects such as movement or color changes when viewed.

In some cases, an image may be in digital form, such as resulting from being digitally captured, e.g., via a digital camera, optical sensor, etc., or through scanning a photograph with a scanner, etc. In at least some embodiments, this captured image may be refined to produce an intermediate image, which can be transferred or printed (or used to generate an image to be transferred or printed) to the ID document as a covert image.

In certain cases, bitonal images (e.g., black and white images), such as those produced through mass-transfer thermal printing and laser xerography, may be implemented. Generally, in this embodiment, a captured image is processed to bring out or otherwise enhance relevant features found in the captured image. Relevant features of a human face may include the face outline, nose and mouth pattern, ear outline, eye shape, eye location, hairline and shape, etc., or any other feature(s) that have been deemed to be relevant for identification purposes (e.g., particular features used with matching algorithms such as facial recognition algorithms). Once identified, these featured can be "thickened" or otherwise emphasized. The emphasized features can then form a digital version of a covert image, which can be transferred to an identification card.

Dye diffusion thermal transfer printing ("D2T2") and thermal transfer (also referred to as mass transfer printing) are two printing techniques used to print information on identification cards. For example, D2T2 has been used to print images and pictures, and thermal transfer has been used to print text, bar codes, and single color graphics.

Dye diffusion is a thermal imaging technology that allows for the production of photographic quality images. In dye diffusion printing, one or more thermally transferable dyes (e.g., cyan, yellow, and magenta) are transferred from a donor, such as a donor dye sheet or a set of panels (or ribbons) that are coated with a dye (e.g., cyan, magenta, yellow, black, etc.) to a receiver sheet (which could, for example, be part of an ID document) by the localized application of heat or pressure, via a stylus or thermal printhead at a discrete point. When the dyes are transferred to the receiver, the dyes diffuse into the sheet (or ID card substrate), where the dyes will chemically be bound to the substrate or, if provided, to a receptor coating. Typically, printing with successive color panels across the document creates an image in or on the document's surface. Dye diffusion can result in a very high printing quality, especially because the energy applied to the thermal printhead can vary to vary the dye density in the image pixels formed on the receiver, to produce a continuous tone image. Dye diffusion can have an increased cost as compared to other methods, however, because of the special dyes needed and the cost of dye diffusion ribbons. Also, the quality of dye diffusion printed image may depend at least on an ability of a mechanical printer system to accurately spatially register a printing sequence, e.g., yellow, magenta, cyan, and black.

Another thermal imaging technology is thermal or mass transfer printing. With mass transfer printing, a material to be deposited on a receiver (such as carbon black, referred to by the symbol "K") is provided on a mass transfer donor medium. When localized heat is applied to the mass transfer donor medium, a portion (mass) of the material is physically transferred to the receiver, where it sits "on top of" the receiver. For example, mass transfer printing often is used to print text, bar codes, and monochrome images. Resin black mass transfer has been used to print grayscale pictures using a dithered gray scale, although the image can sometimes look coarser than an image produced using dye diffusion. However, mass transfer printing can sometimes be faster than dye diffusion, and faster printing can be desirable in some situations.

Printing of black ("K") can be accomplished using either dye diffusion or mass transfer. For example, black monochrome "K" mass transfer ribbons include Kr (which designates a thermal transfer ribbon) and Kd (which designates dye diffusion). The black that is created by dye diffusion is referred to as "process black"—i.e., a combination of cyan, yellow and magenta to create black. The K panel is a carbon black entity and is a real "black." Process black will allow IR to pass through, while K will not. The term "D2T2" is a combination of the phrases "Dye Diffusion" (D2) and "Thermal Transfer" (T2); T2 is a mass transfer ribbon panel and performs in a similar fashion as any other mass transfer technology. Both dye diffusion and thermal ink have been combined in a single ribbon (e.g., D2T2 ribbon), which is the well-known YMCK (Yellow-Magenta-Cyan-Black) ribbon. Another panel containing a protectant ("P") or laminate (typically a clear panel) also can be added to the YMCK ribbon.

Commercial systems for issuing ID documents are of two main types, namely so-called "central" issue (CI), and so-called "on-the-spot" or "over-the-counter" (OTC) issue.

CI type ID documents are not immediately provided to the bearer, but are later issued to the bearer from a central location. For example, in one type of CI environment, a bearer reports to a document station where data is collected, the data are forwarded to a central location where the ID document is produced, and the ID document is forwarded to the bearer, often by mail. Another illustrative example of a CI assembling process occurs in a setting where a driver passes a driving test, but then receives her license in the mail from a CI facility a short time later. Still another illustrative example of a CI assembling process occurs in a setting where a driver renews her license by mail or over the Internet, then receives a driver license card through the mail.

In contrast, a CI assembling process is more of a bulk process facility, where many cards are produced in a centralized facility, one after another. For example, picture a setting where a driver passes a driving test, but then receives her license in the mail from a CI facility a short time later. The CI facility may process thousands of cards in a continuous manner.

Centrally issued ID documents can be produced from digitally stored information and generally include an opaque core material (also referred to as "substrate"), such as paper or plastic, sandwiched between two layers of clear plastic laminate, such as polyester, to protect the aforementioned items of information from wear, exposure to the elements and tampering. The materials used in such CI ID documents can offer durability. In addition, centrally issued digital ID documents generally offer a higher level of security than OTC ID documents because they offer the ability to pre-print the core of the CI ID document with security features such as "micro-printing," ultra-violet security features, security indicia and other features currently unique to centrally issued ID documents.

In addition, a CI assembling process can be more of a bulk process facility, in which many ID documents are produced in a centralized facility, one after another. The CI facility may, for example, process thousands of ID documents in a continuous manner. Because the processing occurs in bulk, CI can have an increase in efficiency as compared to some OTC processes, especially those OTC processes that run intermittently. Thus, CI processes can sometimes have a lower cost per ID document, if a large volume of ID documents are manufactured.

In contrast to CI ID documents, OTC ID documents are issued immediately to a bearer who is present at a document-issuing station. An OTC assembling process provides an ID document "on-the-spot". An illustrative example of an OTC assembling process is a Department of Motor Vehicles ("DMV") setting where a driver license is issued to person, on the spot, after a successful exam. In some instances, the very nature of the OTC assembling process results in small, sometimes compact, printing and card assemblers for printing the ID document. It will be appreciated that an OTC card issuing process can be by its nature an intermittent process in comparison to a continuous process.

OTC ID documents of the types mentioned above can take a number of forms, depending on cost and desired features. Some OTC ID documents comprise highly plasticized poly(vinyl chloride) or have a composite structure with polyester laminated to 0.5-2.0 mil (about 13-51 µm) poly(vinyl chloride) film, which provides a suitable receiving layer for heat transferable dyes which form a photographic image, together with any variant or invariant data required for the identification of the bearer. These data are subsequently protected to varying degrees by clear, thin overlay patches (0.125-0.250 mil, or about 3-6 µm) applied at the printhead, holographic hot stamp foils (0.125-0.250 mil, or about 3-6 µm), or a clear polyester laminate (0.5-10 mil, or about 13-254 µm) supporting common security features. These last two types of protective foil or laminate sometimes are applied at a laminating station separate from the printhead. The choice of laminate dictates the degree of durability and security imparted to the system in protecting the image and other data.

One response the counterfeiting of ID documents includes the integration of verification features that are difficult to copy by hand or by machine, or which are manufactured using secure and/or difficult to obtain materials. One such verification feature is the use in the ID document of a signature of the ID document's issuer or bearer. Other verification features have involved, for example, the use of watermarks, biometric information, microprinting, covert materials or media (e.g., ultraviolet (UV) inks, infrared (IR) inks, fluorescent materials, phosphorescent materials), optically varying images, fine line details, validation patterns or marking, and polarizing stripes. These verification features are integrated into an ID document in various ways and they may be visible or invisible (covert) in the finished card. If invisible, they can be detected by viewing the feature under conditions which render it visible. At least some of the verification features discussed above have been employed to help prevent and/or discourage counterfeiting.

Covert security features are those features whose presence is not visible to the user without the use of special tools (e.g., UV or IR lights, digital watermark readers) or knowledge. In many instances, a covert security feature is normally invisible to a user. Some technologies that involve invisible features require the use of specialized equipment, such as a detector or a device capable of reading digital watermarks. One type of covert security feature is the printing of information (images, designs, logos, patterns, text, etc.) in a material that is not visible under normal lighting conditions, but can be viewed using a special non-visible light source, such as an ultraviolet (UV) or infrared (IR) light source. Use of UV and/or IR security features can be advantageous because although the devices (for example, UV and/or IR light sources) required to see and use such features are commonly available at a reasonable cost, the ability to manufacture and/or copy at least some implementations of such features is far less common and can be very costly. UV and IR based covert security features thus can help deter counterfeiters because the features cannot be copied by copiers or scanners and are difficult to manufacture without the requisite know-how, equipment, and materials.

Many images, such as color images, are formed by subtractive techniques, e.g., light is passed through absorbing dyes and the combination of dyes produce an image by sequentially subtracting cyan, magenta, and yellow components to provide the full color image. In the case of a UV fluorescing image, the UV image is formed by light emitting from fluorescing dyes or pigments as they are activated by a UV light or energy source. A UV image can be imparted to an ID document via methods such as thermal transfer or D2T2.

Regardless of whether the UV materials are imparted via D2T2 or mass transfer panel, both panels produce transmissive images—the mass transfer panel produces a bitonal (e.g., two tone) image and the dye sublimation panel produces a monochromatic (or shaded) image.

Color shifting and other optically variable pigments, inks, dyes, and colorants (collectively "optically variable media") have a feature of appearing to change color as the viewing angle of an observer changes (or as the angle of incident light striking the media changes). Optically variable media have been used on security documents, such as identification cards, credit cards, checks, title documents, currency, etc. The optically variable property provides several advantages when used on security documents: (a) the presence and appearance of optically variable quality provides another "check" or method to authenticate the security document; (b) optically variable media are generally more difficult for a layman to obtain and use properly, thus helping to prevent (or at least limit) forgery and to make forgeries and/or alteration easier to detect; and (c) photocopiers and scanners generally will not reproduce many types of optically variable media, helping to reduce unauthorized reproduction or counterfeiting of such documents.

Several methods exist to create optically variable media and to apply such media to security documents. One method involves dispersing in a medium (e.g., paint or ink) a plurality of relatively small particles (typically flakes) that have specific optical properties. In one example, a security document includes a plurality of thin film layers, each film having a particular color and/or optical property. In some cases, media having optically variable properties include particles comprising flat, irregularly shaped mica platelets coated with titanium dioxide and/or iron oxide. These particles, when dispersed in media, can give a generally "pearlescent" effect, with smaller particles producing a "satin" effect and larger particles producing a "glitter" effect. In many instances, optically variable media are incorporated into a material such as a laminate layer or overlaminate layer, providing an optically variable indicia that overlays other information on the card. Generally, such an optically variable indicium contains "fixed" or "invariable" data (information that is the same from ID document to ID document).

In some cases, it is advantageous to print variable or personal UV information at the time of ID document personalization, in one, two, or three UV colors, especially images that have a high enough quality to be used for authentication and/or identification. It is also advantageous if the same information is printed in a visible and invisible (e.g., UV) form at substantially the same time or at substantially the same printing step, where the covert image would be "identification quality."

An ID document having a window as described herein is fabricated in a platen lamination process, in which component layers of the ID document are fused together with heat, pressure, or both, without adhesives. Platen lamination allows the formation of flat cards with little or no thermal stress, as compared to roll lamination that creates stresses by stretching and laminating in a non-uniform manner. Platen lamination also reduces or eliminates surface interactions due to electrical charge and surface non-evenness, thereby improving card transportation in the card printer. One or more of the component layers may be preprinted (e.g., with invariable data). The resulting ID document is referred to herein as a "card blank" or "blank card." The invariable data may be present as microprint or added in an offset printing process on one of the layers used to construct the card blank. The resulting ID document is durable and solid, suitable for OTC or CI issue, and has an expected useful lifetime of at least 10 years.

The dynamic window, an optically functional element that delivers different visual characteristics when viewed under different lighting conditions, is formed during fabrication of the card blank. Security features may be added by the printing process, the laminating process, or both in an OTC or CI process. Thus, an ID document with a window as described herein may be used as an OTC issue, with variable features (e.g., a photograph of the cardholder) printed (e.g., with optically variable media) on the window, other portions of the card blank, or both before lamination. As such, security features involving variable data may be added during an OTC process at an issuing location.

FIG. 1 depicts ID document 100 with dynamic window 102 viewed in reflected light. As depicted, dynamic window 102 is circular, but may be any shape (e.g., elliptical, rectangular, square, irregular, etc.). Dynamic window 102 has coating 104. As described with respect to FIG. 1, coating 104 is on a back of dynamic window 102, corresponding to a back of ID document 100. In some cases, dynamic window 102 has more than one coating (e.g., a first coating on a front of the dynamic window and a second coating on the back of the dynamic window). Coating 104 is an optically variable coating. Dynamic window 102 has a first visual characteristic when viewed from front 106 of ID document 100 in reflected light and a second visual characteristic when backlit (i.e., viewed from front 106 with light transmitted through dynamic window 102 from back 108 toward front 106). When viewed in reflected light, the primary light source is on the same side of ID document as the viewer. When backlit, the primary light source is on the opposite side of the ID document as the viewer. The first visual characteristic and the second visual characteristic, as well as the difference between the first visual characteristic and the second visual characteristic, are distinguishable with the unassisted human eye. The appearance of dynamic window 102 may vary, for example, based on the properties of coating 104 as well as a function of the location of the primary light source. In some cases, dynamic window 102 may exhibit a special effect (e.g., gold metallic or silver metallic) based upon coating 104.

As described with respect to FIG. 1, image 110 is printed on or superimposed above a front side of dynamic window 102 (e.g., on a layer of the laminate between the front of identification document 100 and the core layer). In some cases, ID document 100 includes more than one image 110 (e.g., a first image as described with respect to FIG. 1 and a second image on a back of dynamic window 102 or on a layer of the laminate between the back of identification document 100 and the core layer). Image 110 may include variable data (e.g., a photographic image of the cardholder) printed in an OTC or CI process. As depicted in FIG. 1, image 110 is understood to be a replica of primary color image 112. In some cases, optically variable ghost image 114, described below in more detail, may also be present. When viewed from front 106 of ID document 100 in reflected light having a first angle of reflection, dynamic window 102 has a first visual appearance (e.g., dynamic window appears colored, opaque, reflective, metallic, or the like, based on the properties of coating 104), which serves as a background for image 110. Optically variable ghost image 114 may also be most visible in reflected light at this angle of reflection. When viewed from front 106 of ID document 100 in reflected light at a second angle of reflection (e.g., as in FIG. 2), image 110 appears to be on a muted background. In one example, when dynamic window 102 has a gold metallic appearance when viewed in reflected light at a first angle of reflection with respect to front 106, image 110 appears to be overlaid on an opaque gold metallic background, due at least in part to a high ratio of reflected to transmitted light. When viewed in reflected light at a second angle of reflection, image 110 appears to be overlaid on a muted gold metallic background, due at least in part to a relatively lower ratio of reflected to transmitted light.

When ID document 100 is viewed from back 108 in reflected light having a first angle of reflection (i.e., with the viewer looking at the back of the ID document and the primary light source on the same side of the ID document as the viewer), image 110 is not visible, and dynamic window 102 has a uniform, opaque appearance determined by coating 104 on the dynamic window, due at least in part to a high ratio of reflected to transmitted light. When ID document 100 is viewed from back 108 in reflected light having a second angle of reflection, image 110 is visible on dynamic window 102, and the image and the dynamic window both have a muted appearance, due at least in part to a relatively lower ratio of reflected to transmitted light. In one example, when dynamic window 102 has a bright gold metallic appearance when viewed in reflected light from front 106 of ID document 100, the dynamic window has a solid bright gold metallic appearance when viewed in reflected light at a first angle of reflection from back 108 of the ID document, and image 110 is not visible. When viewed in reflected light having a second angle of reflection from back 108 of ID document 100, image 110 and dynamic window 102 have a muted appearance.

An ID document, such as ID document 100, may have one or more of the following additional features generally known in the art: Guilloche security design, micro-print, microprint with deliberate error, security indicia, laser perforation, split fountain printing, IDMARC, variable microscript, altered font, overlapping data, UV printed variable data, redundant data, one-dimensional bar code, two-dimensional bar code, tri-color optically variable device, magnetic stripes, digital watermarks, covert image, and biometric information (e.g., fingerprint, etc.). Each of these features, is optional, and the positioning or embedding of these features is variable.

Figure 2:
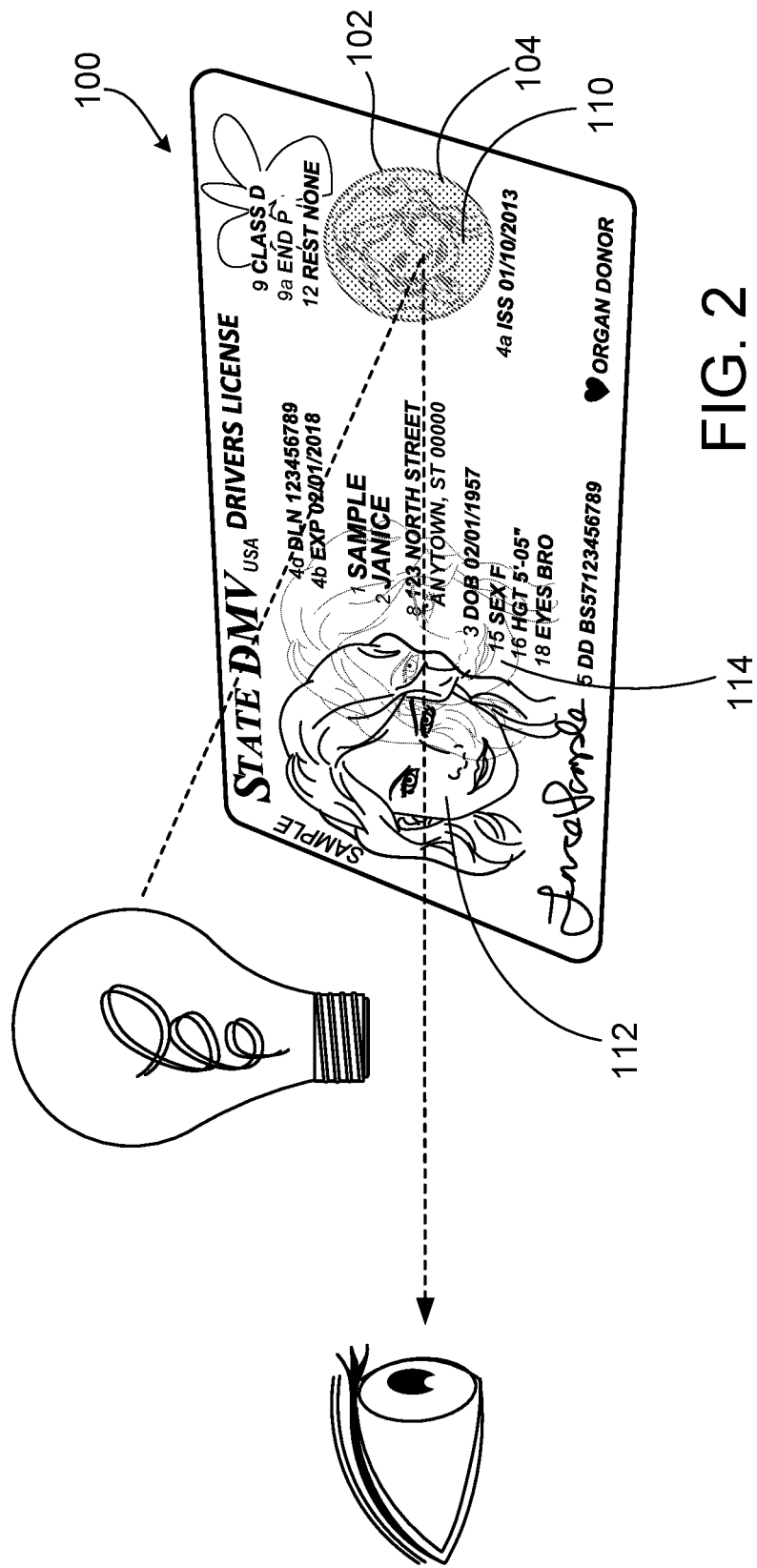
FIG. 2 depicts the ID document of FIG. 1 viewed from the front of the ID document in reflected light at having a second angle of reflection with respect to the front of the ID document.

FIG. 2 depicts ID document 100 viewed from the front in reflected light at an angle of reflection that differs from that depicted in FIG. 1. As depicted in FIG. 2, optically variable ghost image 114 is less visible at the angle of reflection in FIG. 2 than at the angle of reflection in FIG. 1. As depicted, optically variable ghost image 114 is a full size (i.e., the same size as color image 112) pixelated image that overlays image 112. Tilting ID document 100 in reflected light causes optically variable ghost image 114 to appear more or less visible, and also causes dynamic window 102 and image 110 to appear more or less muted.

Optically variable ghost image 114 can be a screened-back or "ghost" version of color image 112. In some cases, optically variable ghost image 114 is a color or grayscale halftone version of the color image. Optically variable ghost image 114 is also preferably visible under normal viewing conditions in reflected light, but more visible at a first angle of reflection (e.g., as in FIG. 1) than a second angle of reflection (e.g., as in FIG. 2). A covert image may also correspond to image 112, and may not be visible under "normal" viewing conditions. In one embodiment, a covert image is an ultraviolet (UV) image, meaning that it glows (e.g., visibly fluoresces or emits radiation) in response to appropriate UV stimulation. In some implementations, a covert image fluoresces in the UV spectrum upon excitation with visible light. A covert image may be generally imperceptible under normal (e.g., non-ultraviolet or non-angled) viewing conditions.

As described herein, an optically variable ghost image may generally be printed using optically variable ink. When an optically variable ghost image is generated using any one of known methods, the optically variable ghost image may have an appearance that is analogous to a photographic "inverse" or "negative" of the visible ghost image. This may be referred to as one type of a "mirror-like image," although, of course, "true" mirror images of a given image, such the image of a face reflected from an actual mirror, in fact show a backwards image. One reason this may be referred to as a "mirror-like" image, for at least some embodiments, is because at least some of the optically variable inks used to print the optically variable device (OVD) create a "mirror-like" sheen or luster when printed. Another reason this is referred to as a "mirror-like" image, for at least some embodiments, is the reflective quality of the image. Yet another reason this is referred to as a "mirror-like" image is because, in at least some embodiments, the image can have an appearance that is similar is a photographic inverse or negative of the visible image, except printed using optically variable ink.

Close alignment of the OVD to a corresponding similar visible image, however, is optional. In at least some embodiments an OVD can be applied so as to partially overlay a variable indicium on the ID document, and the variable indicium need not be the same indicium as the OVD. Further, an OVD can be applied to an ID document so that it does not overlay a variable indicium on an ID document.

In one example, a location for an OVD can be selected that permits the OVD to be printed in such a way (described further herein) that it is possible to obtain an appearance of a "flipping" image of the OVD when the ID document is viewed at different angles. This advantageously may be done by printing over an area of the card that does not contain information that would interfere with the appearance of the OVD. The area need not be a substantially blank area of the ID document; for example, the area could contain fixed indicia such as background colors, fine line printing, artwork, scrolls, etc.

In one embodiment, a covert image is an infrared (IR) image, meaning that it glows (e.g., visibly fluoresces or emits radiation) in response to appropriate IR stimulation. In one embodiment, a covert image is a thermachromic image, meaning that it becomes visible only when the image (or entire ID document 100) is subject to a predetermined change in temperature, such as by heating or cooling. In one embodiment, a covert image is an optically variable image, meaning that the covert image is most visible when viewed at a particular angle. In one embodiment, a covert image is formed using a material such as a ferrofluid (available from FeroTec of Nashua, N.H.). Ferrofluids are responsive to magnetic fields, and can be used to produce covert images that become visible when an appropriate magnetic field is applied to the ferrofluid.

In one embodiment, a covert image is a combination of any one or more of UV, IR, thermachromic, ferrofluidic, and optically variable images. For example, a covert image can be both a UV and a thermachromic image by printing the card area, using the methods described herein, with both UV and thermachromic inks, meaning that when subject to appropriate stimulation, the normally "blank" area of the card will display either a UV image (if appropriate UV stimulation is provided) or a thermachromic image (if appropriate temperature is provided). Those skilled in the art will appreciate that many combinations are possible. It is even envisioned that combination type inks, such as UV thermachromic inks (meaning inks that, to display an image, require both UV and appropriate temperature), the methods described herein will be usable with such inks.

In one embodiment, a steganographic code is embedded into a covert image. One form of steganographic encoding is digital watermarking. Digital watermarking is a process for modifying physical or electronic media to embed a machine-readable code into the media. The media may be modified such that the embedded code is imperceptible or nearly imperceptible to the user, yet may be detected through an automated detection process. In some embodiments, the ID document includes two or more digital watermarks.

Digital watermarking systems typically have two primary components: an encoder that embeds the digital watermark in a host media signal, and a decoder that detects and reads the embedded digital watermark from a signal suspected of containing a digital watermark (a suspect signal). The encoder embeds a digital watermark by altering the host media signal. The reading component analyzes a suspect signal to detect whether a digital watermark is present. In applications where the digital watermark encodes information, the reader extracts this information from the detected digital watermark. The reading component can be hosted on a wide variety of tethered or wireless reader devices, from conventional PC-connected cameras and computers to fully mobile readers with built-in displays. By imaging a watermarked surface of the card, the watermark's "payload" can be read and decoded by this reader.

Returning to the present implementation, a digital watermark may be embedded in a covert image. For purposes of illustration, assume that the covert image is a printed UV image. A watermark detector can only read the covert UV watermark if ID document 100 is subject to appropriate UV stimulation at the same time that the host ID document is presented to the watermark detector. This provided additional security to the ID document 100, because even if a counterfeiter is able to access UV inks to print a bogus covert image, the bogus covert image will not contain the embedded digital watermark. Of course, mere photocopying or scanning of ID document 100 will similarly frustrate the counterfeiter, who will be unable to reproduce, through scanning or photocopying, either the covert image or the watermark contained therein.

In one embodiment, the watermark embedded in a covert image may include a payload or message. The message may correspond, e.g., to the ID document number, printed information, issuing authority, biometric information of the bearer, and/or database record, etc. The watermark embedded in the covert image may also include an orientation component, to help resolve image distortion such as rotation, scaling and translation. In at least one embodiment, two or more watermarks are embedded in the optically variable device (OVD) image.

In further embodiments, the watermark embedded in a covert image corresponds to information printed on the ID document, or to information carried by a second watermark embedded elsewhere on the ID document (e.g., background pattern, image 112, etc.).

Methods for printing an optically variable image of variable data (e.g., data that can differ from card to card) onto the ID document, where the optically variable image has a metallic, iridescent, pearlescent, or "mirror-like" sheen or luster at a particular viewing angle, but which still enables the indicia to be perceived at the particular angle. The optically variable indicia is essentially invisible when the ID document is viewed from angles other than the particular angle. This optically variable image can comprise any type of indicium: images (e.g., a photograph), characters (e.g., a birthdate), graphics, etc. In particular, this optically variable image can comprise personalized data (e.g., data specific to a particular holder of an ID document or specific to a group of ID documents).

In one embodiment of this aspect, an optically variable image is printed at the time of card personalization using a specially configured ribbon adapted for D2T2 and/or mass transfer printing. In one embodiment, the optically variable image of variable data is printed onto an area of the ID document that contains little or no other indicia, such that when the ID document is viewed at a first angle, the optically variable image is not visible, but when the document is viewed at a second angle, it becomes visible.

In an advantageous example, ID document 100 will include at least one variable indium (such as a bearer image, signature, ghost image, birthdate, etc.) that is visible to an unassisted human eye, so that such a variable feature may be compared to the optically variable indicia of variable information described in the following paragraph, to detect counterfeiting and/or alteration.

If an optically variable ink is used, and the image (or other indicium) is printed as described herein, the optically variable image may appear to be a first metallic, iridescent, or pearlescent color at a first angle and will appear to be a either not substantially visible or a different color (e.g., in some embodiments, a second metallic, iridescent, or pearlescent color) at a second angle. As will be further described herein, many other embodiments of the "mirror-like optically variable device" can be created. A few examples of "optically variable minor image" include:

printing a dithered or continuous-tone version of an indicium in an optically variable ink;

printing a dithered or continuous-tone version of an indicium in an optically variable ink directly over and in alignment with the same indicium printed in a non-optically variable ink, wherein the indicium in optically variable ink becomes visible at certain viewing angles and the non-optically variable indicium is not visible at those viewing angles;

printing a first dithered or continuous-tone version of an indicium in an optically variable ink directly over and in alignment with a second indicium (which can be the same indicium) printed using a covert material (e.g., ultraviolet (UV) ink, infrared (IR) ink, thermachromic ink, combinations of UV, IR and/or thermachromic, etc.) and optionally in alignment with a third indicium (which can be an indicium that is the same as either or both of the first and second indicia or which can be a third indicium) printed using a non-covert, non-optically variable material;

printing a first dithered or continuous-tone version of an indicium in a first optically variable ink interleaved with a second dithered or continuous tone version of an indicium in a second optically variable ink, where the first and second dithered versions are different enough that a naked human eye can see a shift in the indicium and/or its color as the viewing angle of the image is shifted;

printing a dithered or continuous-tone version of an indicium using more than one optically variable ink, where a first portion of the pixels in the indicium are printed in a first color of optically variable ink and a second portion of the pixels in the indicium are printed using a second color of optically variable ink, wherein the overall appearance of the indicium printed using the two or more colors of optically variable ink can appear to have a luster or sheen as the indicium is viewed from different viewing angles;

printing a dithered or continuous tone version of an indicium using a plurality of colors of optically variable ink, where the indicium is formed on a portion of the ID document that does not contain other indicia; and/or printing an indicium that includes microtext variable data using an optically variable ink, where the microtext variable data is structured and arranged to appear, to the unassisted human eye, to be an optically variable ornamental or decorative element on the another indicium or on the ID document itself (e.g., a border around an image of an individual, a line (or pattern or lines) disposed near fixed indicia on the ID document, a border or design around another security feature, such as a hologram, etc.).

Figure 3:
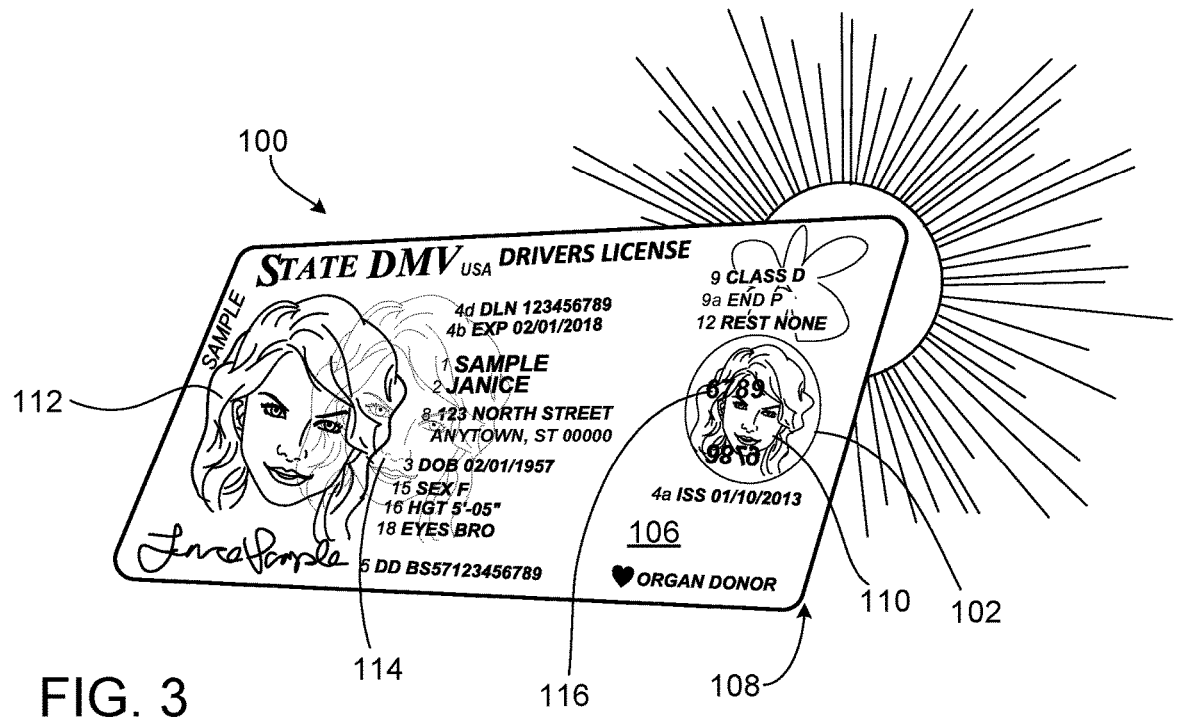
FIG. 3 depicts the ID document of FIG. 1 viewed from the front with light transmitted through the dynamic window from the back to the front of the ID document.

FIG. 3 depicts a top view of ID document 100 of FIG. 1 when the ID document is backlit, such that the ID document is between the viewer and the primary light source, and light is transmitted through dynamic window 102 from back 108 toward front 106. As seen in FIG. 3, dynamic window 102 has a second visual appearance, which is different from the first visual appearance as depicted in FIG. 1. That is, dynamic window 102 appears to be transparent (coating 104 is not visible), and provides a transparent background for image 110 at all viewing angles. In addition, when dynamic window 102 is backlit, laser engraving 116 becomes visible. When ID document 100 is viewed from back 108 with light transmitted through dynamic window 102 from front 106, dynamic window 102 has a transparent appearance, such that image 110 appears on a transparent background at all viewing angles.

In some cases, image 110 on dynamic window 102 may be a bitonal image or a covert or optically variable image. When image 110 is an optically variable ghost image and ID document 100 is viewed from front 106 in reflected light, dynamic window 102 has the first visual appearance and the optically variable ghost image is visible when the ID document is viewed in reflected light at a particular angle of reflection. When image 110 is an optically variable ghost image and ID document 100 is backlit, dynamic window 102 appears to be transparent, and the optically variable ghost image is not visible. That is, when image 110 is an optically variable ghost image, like dynamic window 102, it is visible in reflected light at greater and lesser intensity based on angle of reflection, but is not visible in transmitted light.

Figure 4:
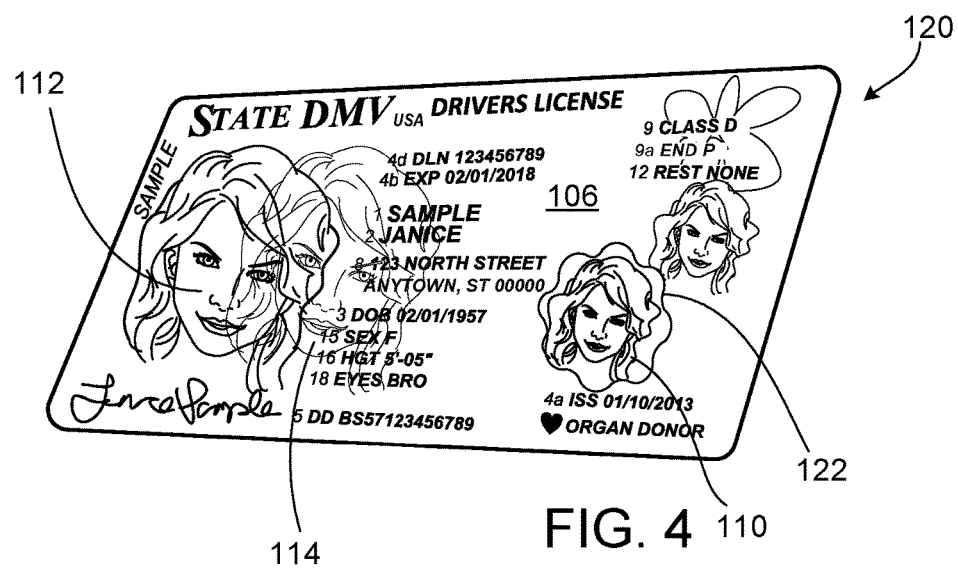
FIG. 4 depicts an ID document with a dynamic window viewed from the front under UV light.

FIG. 4 depicts ID document 120 viewed from front 106 under UV light. As depicted in FIG. 4, optically variable ghost image 114 is responsive to UV light. In one example, optically variable ghost image 114 has a blue glow under UV light. In addition, dynamic window 102 also has a UV response, and appears to glow under UV light.

Figure 5:
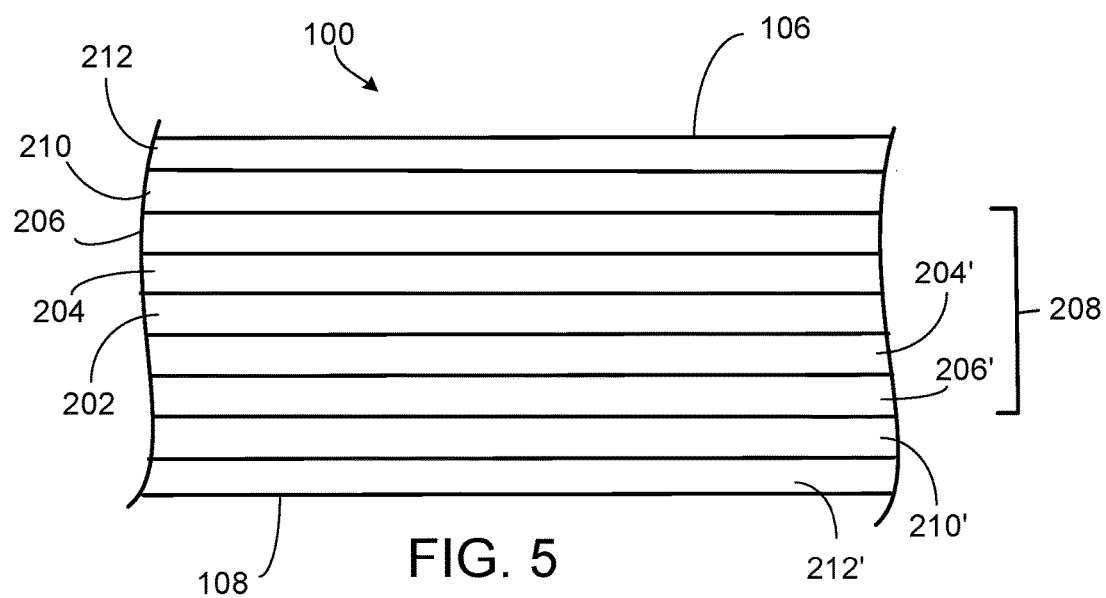
FIG. 5 is a cross-sectional view of the ID document of FIG. 1 taken through line A-A.

FIG. 5 is a cross-sectional view of ID document 100 taken along line A-A of FIG. 1. ID document 100 includes core layer 202, tie layers 204, 204' on either side of the core layer, and structural layers 206, 206' on the outer side of tie layers 204, 204', respectively. Core layer 202 is opaque, houses the dynamic window, and may be preprinted on one or both sides (e.g., with invariable data). One or more of tie layers 204, 204' may also be preprinted, engraved, or both. Tie layers 204, 204' typically include multiple co-extruded layers and promote bonding between core layer 202 and structural layers 206, 206'. Structural layers 206, 206' provide durability as well as stiffness and flatness. Tamper-evident (TE) patterns may be coated onto structural layers 206, 206' via gravure. After assembly (e.g., manually or via machine), core layer 202, tie layers 204, 204', and structural layers 206, 206' are laminated in a platen lamination process to yield card blank 208, formed in the absence of adhesive compositions. The platen lamination process facilitates debossing, as well as the flatness, superior surface finish, and desired polish for card blank 208.

Receiver layers 210, 210' may be coated on the outer side of each structural layer 206, 206', respectively, and may be bonded to the structural layers via solvent dissolution, thereby becoming part of the structural layers. Tamper-evident patterns may be coated on an underside of one or more of receiver layers 210, 210'. Receiver layers 210, 210' allow good image replication (e.g., via D2T2) as well as debossing. Patterns formed by plate debossing go through the D2T2 receiver layer and into the structural layer underneath, thereby providing protection of the image, photo, or text (as applicable) from tampering or counterfeiting. Overlaminate layers 212, 212' may be coated on receiver layers 210, 210', respectively, after personalization. Overlaminate layer 212 represents front 106 of ID document 100, and overlaminate layer 212' represents back 108 of the ID document. Receiver layers 210, 210' and overlaminate layers 212, 212' are not considered to be part of the card blank. Thus, card blank 208 has five layers, including core layer 202, tie layers 204, 204', and structural layers 206, 206'.

Core layer 202 is typically opaque. Suitable materials for core layer 202 include white poly(vinyl chloride) (PVC), polyester, polycarbonate, polystyrene, and the like. TESLIN and other polymers that are capable of z-axis tear out and are immiscible with other polymers are typically not suitable for core layer 202. A thickness of core layer 202 is typically in a range of 5 to 10 mil (about 125 to 250 μm). Fixed indicia may be printed (or pre-printed) on core layer 202. The core layer in at least some embodiments is formed using a material adapted to be printable or markable (e.g., by laser marking) using a desired printing/marking technology. Materials that are printable can include, as an example, materials such as polyolefin, polyester, polycarbonate (PC), PVC, plastic, polyethylene terephthalate (PET), polyethylene terephthalate glycol-modified (PETG), polyethylene terephthalate film (PETF), and combinations thereof. However, materials that can split in the z-axis are typically not suitable. Many other materials are, of course, suitable, as those skilled in the art will appreciate. In an advantageous embodiment, core layer 202 is substantially opaque, which can enable printing on one side to be not viewable from the other side, but opacity is not required. In some embodiments, it may, in fact, be advantageous that core layer 202 be substantially transparent. The color of the core layer 202 may vary, but in an advantageous embodiment the core layer is colored to provide a good contrast with indicia printed (or otherwise formed) thereon. In one example, core layer 202 is light in color, thereby allowing good contrast with dark indicia. In another example, core layer 202 is dark in color, thereby allowing good contrast with light indicia.

Tie layers 204, 204' typically include multiple layers of chemically modified resins with reactive moieties (e.g., isocyanates) attached to the base resin. The reactive moieties in an outer layer of a tie layer are selected form covalent bonds with the layer in contact with the tie layer during lamination. Suitable materials for tie layers 204, 204' are compatible with other materials in the ID document and include PETG and PC. A thickness of tie layers 204, 204' is typically in a range of 2 to 6 mil (about 50 to 150 μm). Thickness, composition, or both of tie layers 204 and 204' may be the same or different. In some cases, a laser engraved image (e.g., a hologram or KINEGRAM) is formed in one or more of tie layers 204, 204' (e.g., in tie layer 204). The laser engraving may be such that the dynamic window in core layer 202 is not affected by the laser engraving (e.g., the optically variable coating on the dynamic window is not ablated or removed by the laser engraving).

Suitable materials for structural layers 206, 206' include PC, polyethers, polyphenoxides, polyphenols, polyesters, polyurethanes, and the like. Structural layers 206, 206' may be sensitized to accept laser engraving. A thickness of structural layers 206, 206' is typically in a range of 2 mil to 10 mil (about 50 μm to about 250 μm). Thickness, composition, or both of structural layers 206, 206' may be the same or different.

Suitable materials for receiver layers 210, 210' include PC (e.g., non-sensitized), coated with, for example, modified PVC with antioxidants. The receiver coating allows good image replication and using deboss patterns promotes protection of printed features (e.g., images, text) from tampering, counterfeiting, or both. A thickness of receiver layers 210, 210' is typically in a range of 4 to 10 mil (about 100 μm to about 250 μm). Thickness, composition, or both of receiver layers 210, 210' may be the same or different.

If two adjacent layers are made of substantially the same material (e.g., polycarbonate), they may be laminated together into a single structure, as understood by those skilled in the art. Similarly, if a laminate and an overlaminate are both made of the same material (e.g., polycarbonate), they can be laminated into a single structure.

If the laminate is made of a material (e.g., PET) that is not itself capable of being imaged using a given printing or marking technology (e.g., D2T2), layers or coatings may be applied to the laminate to make it printable and/or markable. For example, in one embodiment, the laminate is coated with a coating that enhances absorption of laser energy. In another example, an image receiving layer that improves D2T2 printing is applied to the laminate. Variable data (e.g., signature, ghost image, fingerprint, etc.) may be printed a receiver layer, such as by D2T2, mass transfer printing, and/or laser engraving. In one implementation, optically variable indicia of variable data are formed on the laminate by printing the laminate with a conventional D2T2 YMC type of ribbon modified by the addition of a panel containing a thermally transferable thermally transferable optically variable pigment, such as ink or dye.

A window in an ID document described herein, such as dynamic window 102 in ID document 100, may be formed by defining an opening in the core layer (e.g., dye cutting the core layer) and positioning a plastic layer having the same dimensions as the opening and the same thickness as the core layer in the opening, such that the plastic layer is inlaid in the core layer. Suitable materials for the plastic layer include PC, PVC, PETG, and the like. The plastic layer is typically clear plastic having one or more optically functional coatings or devices (e.g., an optically variable coating, a metallic digitally mastered hologram, or both) on one or both sides. The optically functional coatings or devices may be applied to the plastic layer (e.g., before the plastic layer is positioned in the core layer) by methods known in the art, including sputtering, vacuum depositing, solution coating, and the like. Before or after application of the optically functional coatings or devices, the plastic layer is sized to fit in the opening in the core layer. The coated plastic layer is positioned in the opening in the core layer (e.g., as an insert) to yield the dynamic window.

Figure 6:
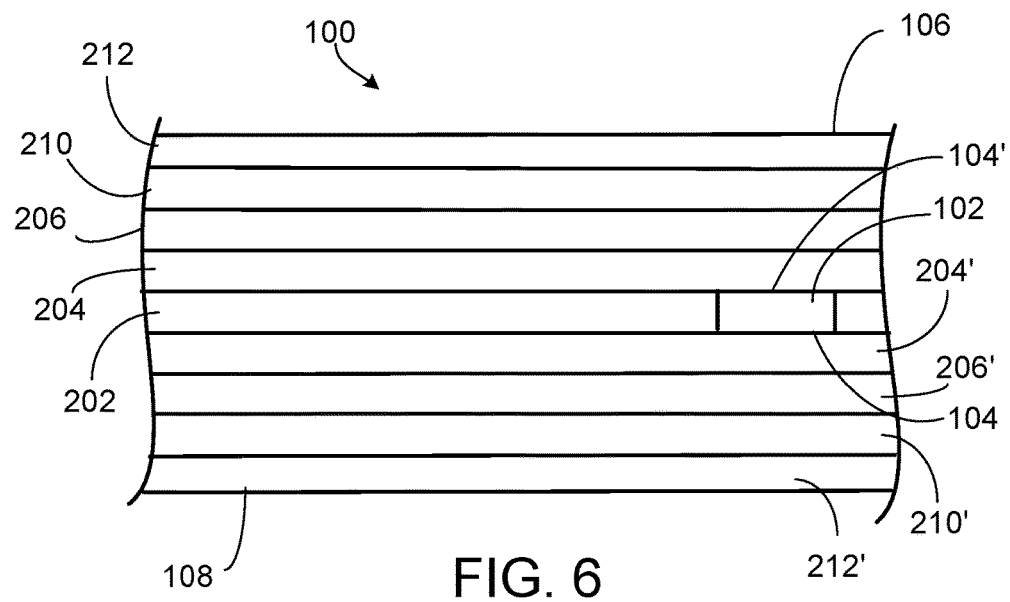
FIG. 6 is a cross-sectional view of the ID document of FIG. 1 taken through line B-B.

FIG. 6 depicts a cross-sectional view of ID document 100 along line B-B of FIG. 1. In one example, card blank 208 is formed by forming an opening in core layer 202 and positioning dynamic window 102 in the opening. In one example, dynamic window 102 formed from clear 6 mil (about 150 μm) plastic film (e.g., PC, PVC, PETG, or the like) with coating 104' on the side of dynamic window 102 facing front 106 of ID document 100, coating 104 on the side of dynamic window 102 facing back 108 of ID document 100, or both. Coatings 104 and 104' may be the same or different. In one example, coating 104 is gold and coating 104' is blue. As used herein, "coating 104, 104" refers to coating 104, coating 104', or both. In some cases, coating 104, 104' includes a metallic digitally mastered hologram.

Dynamic window 102 is typically heat-stable, such that optical properties are maintained during lamination. In some cases, dynamic window 102 is laser sensitive, such that laser engraving may be used to engrave an image, text, or a combination thereof on the film. Dynamic window 102 may be laser sensitive to the exclusion of other components of ID document 100. In certain cases, a metallic KINEGRAM may be printed on dynamic window 102 and a laser (e.g., a YAG laser or $CO_2$ laser) may be used to laser write variable data into the dynamic window before fabrication of the card blank. In still other cases, an optically variable device (OVD) (e.g., a metallic KINEGRAM or hologram) may be printed on either side of dynamic window 102 or on another layer of the ID document and superimposed on either side of the dynamic window.

Fabricating card blank 208 corresponding to ID document 100 as described herein is achieved by assembling the layers of the card blank by hand or machine and plate laminating by pressure, heat, or both by methods and equipment generally known in the art (e.g., buckle laminators). Coating 104, 104' may be applied to dynamic window 102 before or after placement of the dynamic window in core layer 202. The dynamic window is typically held in the core layer by friction or ultrasonically welded in place. Thickness of an exemplary ID document is typically 30±3 mil (about 760±76 μm). These ID documents are generally fabricated to meet applicable ISO and AAMVA standards.

Coating 104, 104' is formed by application of a dispersion to the substrate used to form dynamic window 102. The dispersion typically includes an inorganic pigment, a solvent, and a binder, and is formulated to achieve a viscosity suitable for coating in a coating process (e.g., at least 50 wt % solvent, at least 10 wt % binder, and at least 10 wt % pigment; or 50-70 wt % solvent, 10-25 wt % binder, and 10-30 wt % pigment). Examples of suitable coating processes include gravure coating, sputtering, vacuum depositing, solution coating, or the like. One or more layers (e.g., one to four layers) of the dispersion may be applied to the substrate to yield coating 104, 104', with coating 104' on a front side of dynamic window 102, coating 104 on a back side of dynamic window 102, or both. In some cases, coating 104' completely covers the front side of dynamic window 102, coating 104 completely covers the back side of dynamic window 102, or both. In other cases, portions of dynamic window 102 are free of coating 104, 104', with the excluded regions in the form of text, images, or the like. Coating 104, 104' is essentially free of solvent. A weight ratio of pigment to binder in coating 104, 104' is typically in a range of 0.5 to 2 (e.g., a range of 0.75 to 1.75 or 1 to 1.5).

The inorganic pigment generally includes particles such as rod-shaped particles or structured thin metallic platelets (e.g., flakes) that act as mirrors. The optical intensity of the platelets changes according to the angle from which they are viewed. Maximum light intensity is achieved near the angle at which the incident light is totally reflected. Minimum light intensity is experienced at an angle far away from total reflection. After the dispersion is applied to the substrate, the solvent evaporates and the particles align on the substrate and are immobilized in the binder, yielding aligned particles in a film on the substrate. When the primary light source is transmitted through the dynamic window toward the viewer, coating 104, 104' has a transparent appearance.

Examples of suitable solvents include ketones, aliphatic or cyclic ethers, and acetates, such as ethyl acetate, propyl acetate (e.g., n-propyl acetate), butyl acetate (e.g., n-butyl acetate), and the like. Examples of suitable binders include PVCs, vinyl acetates, and copolyester resins (e.g., VITEL copolyester resins available from Bostik, such as VITEL 2700B LMW and VITEL 5833B, and the like) that are soluble in the solvent. Examples of suitable inorganic pigments include IRIODIN/AFFLAIR 103 Rutile Sterling Silver (available from EMD Chemicals) and FLAMENCO Gold 220C (available from BASF). IRIODIN/AFFLAIR 103 Rutile Sterling Silver is a pearlescent silver pigment comprised of mica-based flakes coated with a thin layer of metal oxides (e.g., $TiO_2$ and $SnO_2$). FLAMENCO Gold 220C is a pearlescent gold pigment that includes mica and $TiO_2$. The interplay of colors produced by these pigments is due to the layered structure of the metal oxides, which is also imparts a rich, deep glossy effect. Particle sizes ranging from about 10 to about 60 microns are suitable for digital thermal printing ribbon application described herein (e.g., 300 dpi). In one example, coating 104, 104' is formed from a dispersion containing 12.4 wt % n-butyl acetate, 49.6 wt % n-propyl acetate, 16.5 wt % VITEL 2700B LMW, 1.5 wt % VITEL 5833B, and 20 wt % Flamenco Gold 220C, such that the weight ratio of pigment to binder in coating 104, 104' is about 1.

During personalization of the card blank, image 110 may be printed on a transparent layer (e.g., receiver layer 210) superimposed on dynamic window 102. Referring to ID document 100, when dynamic window 102 is viewed from back 108 of ID document 100 in reflected light, the light travels through transparent layers of the ID document and reflects from coating 104 imparting an opaque appearance to the dynamic window, and image 110 is not visible. When dynamic window 102 is viewed from front 106 of ID document 100 in reflected light, light travels through transparent layers of the ID document to image 110 and coating 104 and reflects from the coating, such that the image is seen to have a background that corresponds to the coating. When dynamic window 102 is viewed from front 106 or back 108 of ID document 100 in transmitted light (e.g. backlit), light is not reflected from coating 104 and dynamic window 102 has a transparent appearance, with image 110 visible in the dynamic window. When an image is printed or superimposed on a back of dynamic window 102 (e.g., on receiver layer 210'), corresponding principles apply, based on the presence of coating 104, 104', or both.

In one implementation, identical images are printed on each receiver layer and on a front or back of the dynamic window, with the identical images superimposed such that the identical images appear to be a single image or three separate images based on the angle at which the dynamic window is viewed from the front of the identification document in light transmitted through the dynamic window from a back of the identification document toward the front of the identification document.

In one example, a card blank corresponding to ID document 100 described herein includes layers 202, 204, 204', and 206, 206', as defined below.

Structural layer 206: 6 or 7 mil polycarbonate (PC) (non-sensitized);

Tie layer 204: 5 mil five-layer co-extruded tie layer (e.g., PETG/PETG+PC/PC/PETG+PC/PETG);

Core layer 202: 6 or 8 mil (depending upon the corresponding caliper of the structural layers to achieve ISO compliance) white polyvinyl chloride (PVC) with window;

Tie layer 204': 5 mil five-layer coextruded tie layer (e.g., PETG/PETG+PC/PC/PETG+PC/PETG); and Structural layer 206': 6 or 7 mil PC (non-sensitized).

Receiver layers 210, 210' (e.g., 2-6 mil D2T2 receiver layers) may be coated on structural layers 206, 206', respectively, via a roll-based gravure process in a separate coating unit as a part of the process of preparing the material components for assembly in a card structure. The resulting card may be personalized in a CI or OTC setting and the printed card may be overlaminated. In one example, overlamination layers 212, 212' may be applied over receiver layers 210, 210', respectively, with a desktop (e.g., D2T2) printer or large in-line printer or laminator (e.g., Datacard MX-6100).

It should be appreciated that while many of the Figures shown herein illustrate a particular species of ID document—a driver license—the scope of this disclosure is not so limited. Rather, methods and techniques described herein, apply generally to all ID documents defined above. Moreover, techniques described herein are applicable to non-ID documents, e.g., such as printing or forming covert images on physical objects, holograms, etc., etc. Further, instead of ID documents, the techniques described herein can be employed with product tags, product packaging, business cards, bags, charts, maps, labels, etc., etc., particularly those items including providing a non-visible indicia, such as an image information on an over-laminate structure. The term ID document is broadly defined herein to include these tags, labels, packaging, cards, etc. In addition, while some of the examples above are disclosed with specific core components, it is noted that laminates can be sensitized for use with other core components. For example, it is contemplated that aspects described herein may have applicability for articles and devices such as compact disks, consumer products, knobs, keyboards, electronic components, decorative or ornamental articles, promotional items, currency, bank notes, checks, etc., or any other suitable items or articles that may record information, images, and/or other data, which may be associated with a function and/or an object or other entity to be identified.

It should be appreciated that the methods described above with respect to FIGS. 1-6, as well as the methods for implementing and embedding digital watermarks, can be carried out on a general-purpose computer. These methods can, of course, be implemented using software, hardware, or a combination of hardware and software.

The technology and solutions disclosed herein have made use of elements and techniques known from the cited documents. Other elements and techniques from the cited documents can similarly be combined to yield further implementations within the scope of the disclosure. Thus, for example, single-bit watermarking can be substituted for multi-bit watermarking, technology described as using imperceptible watermarks or encoding can alternatively be practiced using visible watermarks (glyphs, etc.) or other encoding, local scaling of watermark energy can be provided to enhance watermark signal-to-noise ratio without increasing human perceptibility, various filtering operations can be employed to serve the functions explained in the prior art, watermarks can include subliminal graticules to aid in image re-registration, encoding may proceed at the granularity of a single pixel (or DCT coefficient), or may similarly treat adjoining groups of pixels (or DCT coefficients), the encoding can be optimized to withstand expected forms of content corruption, etc. Thus, the exemplary embodiments are only selected samples of the solutions available by combining the teachings referenced above. The other solutions necessarily are not exhaustively described herein, but are fairly within the understanding of an artisan given the foregoing disclosure and familiarity with the cited art. The particular combinations of elements and features in the above-detailed embodiments are exemplary only; the interchanging and substitution of these teachings with other teachings in this and the incorporated-by-reference patent documents are also expressly contemplated.

Further modifications and alternative embodiments of various aspects will be apparent to those skilled in the art in view of this description. For example, while some of the detailed embodiments described herein use UV, IR, thermachromic, and optically variable inks and/or dyes by way of example, the present disclosure is not so limited. Accordingly, this description is to be construed as illustrative only. It is to be understood that the forms shown and described herein are to be taken as examples of embodiments. Elements and materials may be substituted for those illustrated and described herein, parts and processes may be reversed, and certain features may be utilized independently, all as would be apparent to one skilled in the art after having the benefit of this description.

What is claimed is:

1. An identification document comprising:
a multilayer laminate comprising a core layer defining an opening therethrough; and
a dynamic window in the opening, the dynamic window comprising an optically variable coating on a back of the dynamic window, wherein a front of the dynamic window is between a front of the identification document and the back of the dynamic window, the back of the dynamic window is between a back of the identification document and the front of the dynamic window; and
an image superimposed on the front of the dynamic window,
wherein the image is visible and the entire dynamic window provides a transparent background for the image when the image is viewed from the front of the identification document in light transmitted through the dynamic window from the back of the identification document toward the front of the identification document, and the image is visible and the entire dynamic window provides a nontransparent background for the image when the image is viewed from the front of the identification document in light reflected from the front of the identification document.

2. The identification document of claim 1, wherein the optically variable coating comprises an inorganic pigment dispersed in a binder, and the inorganic pigment comprises particles aligned in the binder to yield a mirror effect in reflected light.

3. The identification document of claim 1, wherein an optical intensity of the dynamic window changes according to an angle at which the dynamic window is viewed in reflected light.

4. The identification document of claim 3, wherein a maximum optical intensity of the dynamic window in reflected light is achieved near an angle at which incident light is totally reflected from the optically variable coating.

5. The identification document of claim 4, wherein the dynamic window appears to be opaque when the incident light is totally reflected from the optically variable coating.

6. The identification document of claim 1, wherein the image is printed on a layer of the multilayer laminate between the front of the identification document and the front of the dynamic window.

7. The identification document of claim 6, wherein the image is a color image.

8. The identification document of claim 6, wherein the image is visible from the front of the identification document in light reflected from the front of the identification document and is visible from the front of the identification document in light transmitted from the back of the identification document through the dynamic window.

9. The identification document of claim 6, wherein the image is invisible from the back of the identification document in light reflected from the back of the identification document and is visible from the back of the identification document in light transmitted from the front of the identification document through the dynamic window.

10. The identification document of claim 1, wherein the dynamic window is laser engraved, and the laser engraving is visible when the identification document is viewed from the front with light transmitted from the back of the identification document to the front of the identification document through the dynamic window, and the laser engraving is not visible when the identification document is viewed from the front of the identification document in reflected light.

11. The identification document of claim 1, wherein the multilayer laminate is devoid of an adhesive composition.

12. The identification document of claim 1, comprising a tie layer laminated to each side of the core layer, wherein each tie layer comprises multiple layers of chemically modified resins.

13. The identification document of claim 12, comprising a structural layer laminated to an outer side of each tie layer.

14. The identification document of claim 13, comprising a receiver layer adjacent an outer side of each structural layer.

15. The identification document of claim 14, wherein images identical to the image superimposed on the front of the dynamic window are printed on each receiver layer, wherein the identical images are superimposed such that the identical images appear to be a single image or three separate images based on an angle at which the dynamic window is viewed from the front of the identification document in light transmitted through the dynamic window from the back of the identification document toward the front of the identification document.

16. The identification document of claim 12, comprising a laser engraved image formed in at least one of the tie layers.

17. The identification document of claim 16, wherein the laser engraved image is a hologram.

18. The identification document of claim 16, wherein the optically variable coating is not altered by the laser engraved image.

19. The identification document of claim 1, wherein the dynamic window comprises a clear plastic layer.

20. The identification document of claim 1, wherein the optically variable coating is a first optically variable coating, and further comprising a second optically variable coating on the front of the dynamic window.

21. The identification document of claim 20, wherein the first optically variable coating is different from the second optically variable coating.

22. The identification document of claim 1, wherein the optically variable coating completely covers the back of the dynamic window.

23. The identification document of claim 1, wherein the optically variable coating covers selected portions of the back of the dynamic window.

24. The identification document of claim 1, wherein the optically variable coating comprises at least one of an optically variable pigment, an optically variable ink, an optically variable dye, and an optically variable colorant.

25. A method of fabricating an identification document, the method comprising:
    forming an opening in a core layer;
    positioning a dynamic window in the opening, the dynamic window comprising an optically variable coating on a back of the dynamic window, wherein the front of the dynamic window is between a front of the identification document and the back of the dynamic window, the back of the dynamic window is between a back of the identification document and the front of the dynamic window; and
    superimposing an image on the front of the dynamic window,
    wherein the image is visible and the entire dynamic window provides a transparent background for the image when the image is viewed from the front of the identification document in light transmitted through the dynamic window from the back of the identification document toward the front of the identification document, and the image is visible and the entire dynamic window provides a nontransparent background for the image when the image is viewed from the front of the identification document in light reflected from the front of the identification document; and
    plate laminating the core layer and the dynamic window between at least one outer layer on each side of the core layer.

26. The method of claim 25, wherein the laminating occurs in the absence of an adhesive composition.

* * * * *